C. L. ALLEN & B. F. LUKE.
E. J. LUKE, E. H. SPARKS & C. L. ALLEN, ADMINISTRATORS. E. H. SPARKS & C. L. ALLEN, SURVIVING ADMINISTRATORS OF B. F. LUKE, DEC'D.
POTATO HILLER AND WEEDER.
APPLICATION FILED JUNE 20, 1912.
1,099,080.
Patented June 2, 1914.
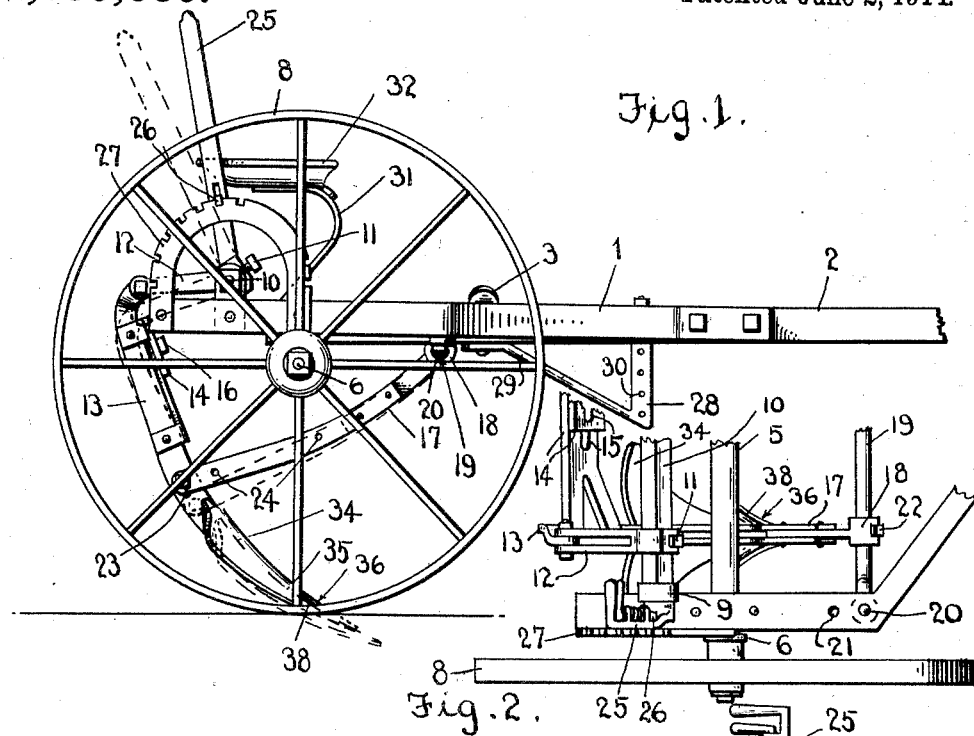
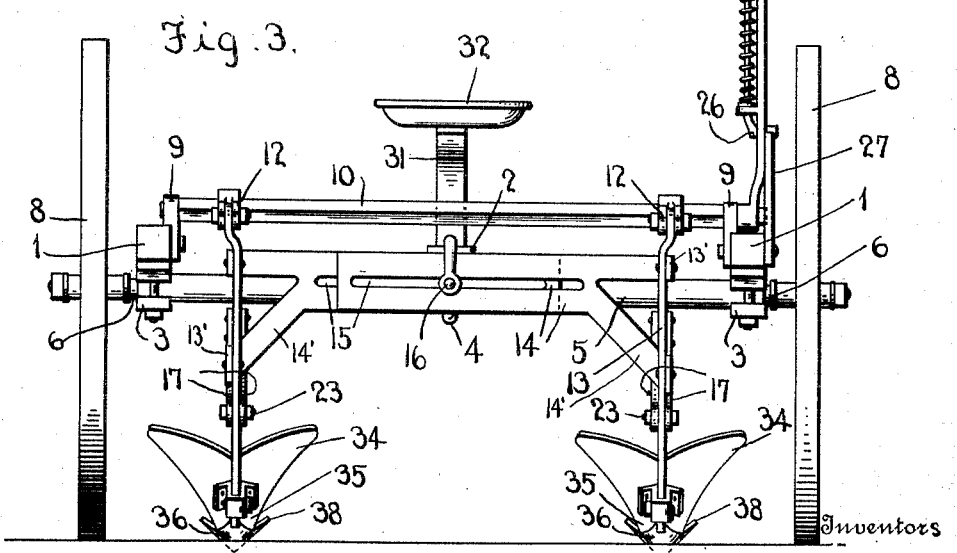
Witnesses
L. B. James
C. E. Hunt
Inventors
B. F. Luke deceased
Charles L. Allen
by Emily J. Luke, Edward H. Sparks & Chas. L. Allen administrators
By H. B. Willson & Co
Attorneys

UNITED STATES PATENT OFFICE.

CHARLES L. ALLEN, OF SALT LAKE CITY, AND BENJAMIN F. LUKE, DECEASED, LATE OF SALT LAKE CITY, UTAH, BY EMILY J. LUKE, EDWARD H. SPARKS, AND CHARLES L. ALLEN, ADMINISTRATORS, ALL OF SALT LAKE CITY, UTAH; SAID EDWARD H. SPARKS AND CHARLES L. ALLEN SURVIVING ADMINISTRATORS OF BENJAMIN F. LUKE, DECEASED.

POTATO HILLER AND WEEDER.

1,099,080.  Specification of Letters Patent. Patented June 2, 1914.

Application filed June 20, 1912. Serial No. 704,937.

*To all whom it may concern:*

Be it known that BENJAMIN F. LUKE, deceased, late a citizen of the United States and resident of Salt Lake City, Utah, and I, CHARLES L. ALLEN, a citizen of the United States, and a resident of Salt Lake City, in the county of Salt Lake and State of Utah, jointly invented new and useful Improvements in Potato Hillers and Weeders, and that I, CHARLES L. ALLEN, and I, EDWARD H. SPARKS, and I, EMILY J. LUKE, being duly constituted administrators and administratrix of the estate of BENJAMIN F. LUKE, do hereby declare the following to be a full, clear, and exact description of the said joint invention of the said CHARLES L. ALLEN and BENJAMIN F. LUKE and such as will enable others skilled in the art to which it appertains to make and use the same.

This invention relates to improvements in potato hillers and weeders.

One object of the invention is to provide a machine of this character having an improved construction of supporting frame provided with adjustable means for supporting the different ground working implements with which the machine is provided, whereby furrows and hills may be formed at different distances apart.

Another object is to provide a machine of this character whereby the ground working implements may be readily adjusted for working the ground to a greater or less depth.

With these and other objects in view, the invention consists of certain novel features of construction, and the combination and arrangement of parts as will be more fully described and claimed.

In the accompanying drawings: Figure 1 is a side view of the improved hilling and weeding machine showing in full and dotted lines the manner in which the plows are adjusted for working the ground to a greater or less depth; Fig. 2 is a fragmentary plan view of the machine; Fig. 3 is a rear view.

In the embodiment of the invention we provide a supporting frame comprising side bars 1, which converge at their forward ends and are attached to the tongue 2 of the machine. Arranged transversely below the side bars 1 and firmly secured at its ends to said bars by suitable clips 3 and intermediate its ends to the rear end of the tongue 2 by an eye bolt 4, is an axle supporting tube or sleeve 5, in which and projecting beyond the ends thereof, are axle members 6 carrying wheels 8, as shown.

Mounted in suitable bearings 9 on the side bars 1 near their rear ends, is a rock shaft 10 which is preferably of square or rectangular cross-section between the ends thereof, as shown. Adjustably secured to the shaft 10 by set screws 11, are short collars at the inner ends of arms 12, to the outer ends of which are pivotally connected the upper ends of plow standards 13. The standards 13 are adjustably connected and braced by inwardly projecting overlapping plates 14 which are provided with alined slots 15 where they overlap each other, the slots being engaged by a clamping bolt 16 which may be set up after the plates have been adjusted. The outer end of each plate is forked as shown at 14' in Fig. 3, and the arms of the fork have rearwardly turned feet 13' which are riveted to the standards 13 so that the latter are thoroughly braced by the plates after the clamping bolt 16 has been set.

The standards 13 are connected by slightly curved draw bars 17 with collars 18 which are adjustably engaged with a cross bar 19 which is adjustably secured to the side bars 1 by means of bolts 20 which are engaged with the ends of the bar and with series of bolt holes 21 formed in the side bars 1, as shown. The collars are adjustably secured to the bar 19 by set screws 22 which are adapted to be screwed into engagement with the cross bar. The rear ends of the draw bars 17 are bifurcated to receive the standards 13 which are adjustably secured in the bifurcated ends of the draw bars by bolts 23 which are engaged with said standards, and with series of bolt holes 24 in the bifurcated ends of the draw bars, as shown.

By adjustably connecting the cross bar 19 with the side bars of the frame, and adjustably connecting the plow standards 13 with the rear ends of the draw bars 17, the angle of the standards and the plows carried thereby may be regulated to cause the plows to work the ground to a greater or less depth, as will be readily understood. Vertical adjustment of the plow standards and plows carried thereby is also accomplished by means of a hand lever 25 fixed on one end to the shaft 10 within convenient reach of the driver or operator of the machine. Said lever, when moved forwardly, will rock the shaft 10, thereby swinging the arms 12 upwardly and lifting the standards and the plows or other ground working implements thereon, to a greater or less extent; and when said lever is moved rearwardly the shaft will be rocked in the proper direction for lowering the standards and the plows carried thereby, thus forcing the plows more or less deeply into the ground.

The lever 25 is provided with a spring projected pawl 26 adapted to be engaged with the notches of a segmental rack 27, whereby the lever is locked and will hold the standards and the plows thereon in the positions to which they have been adjusted. When the lever 25 is swung forwardly to its greatest extent the shaft 10 will be rocked to a sufficient degree for raising the standards and plows entirely above the ground, thus facilitating the movement of the machine from one place to another.

Secured to the lower side of the tongue and projecting downwardly a suitable distance below the same, is a draft bar 28, which is braced by a rearwardly projecting inclined brace bar 29, and in which is formed a vertical series of bolt holes 30 adapted to receive the attaching bolt of a whiffle tree or other draft device by means of which the latter is adjustably attached to the machine. Secured to the rear end of the tongue, preferably by the upper end of the eye bolt 4, is a seat supporting spring 31 on which is arranged the driver's seat 32.

In the drawings, the standards 13 are shown as having applied thereto hilling plows which are of substantially triangular shape and have the diverging upper ends 34 of their blades 35 curved forwardly to a slight extent, as shown. Adapted to be secured to the forward ends of the plow blades are interchangeable points 36 substantially triangular in shape and having on their side edges upwardly projecting outwardly flared cultivating wings 38.

Having thus described our invention, what we claim is:

1. In a machine of the character described, the combination with a wheeled supporting frame, rock shaft mounted thereon and angular in cross section, means for adjusting the position of this shaft manually, and a pair of arms having collars adjustable longitudinally on said shaft; of upright plow standards pivotally connected with the outer ends of said arms and carrying ground-working implements, two bracing plates disposed transversely of said supporting frame and overlapping each other, and means for adjusting them where they lap, the outer end of each plate being forked and the arms of the fork having rearwardly turned feet riveted to a standard, for the purpose set forth.

2. In a machine of the character described, the combination with a wheeled supporting frame, rock shaft mounted thereon and angular in cross section, means for adjusting the position of this shaft manually, and a pair of arms having collars adjustable longitudinally on said shaft; of plow standards pivotally connected with the outer ends of said arms and carrying ground-working implements, transverse plates projecting from said standards alongside each other and slotted where they lap, a clamping bolt adjustably mounted through the alined slots, draw bars pivotally connected at their rear ends with said standards and having collars at their front ends, and a cross bar in said frame on which said collars are adjustably mounted.

In testimony whereof, I, CHARLES L. ALLEN, have hereunto set my hand in the presence of two subscribing witnesses.

CHARLES L. ALLEN.

Witnesses:
   H. M. H. LUND,
   T. L. LARSEN.

In testimony whereof, we, EMILY J. LUKE, administratrix, EDWARD H. SPARKS and CHARLES L. ALLEN, administrators, of the estate of BENJAMIN F. LUKE, have hereunto set our hands in the presence of two subscribing witnesses.

EMILY J. LUKE,
*Administratrix.*
EDWARD H. SPARKS,
CHARLES L. ALLEN,
*Administrators.*

Witnesses:
   H. M. H. LUND,
   T. L. LARSEN.